US012608641B2

(12) United States Patent
De La Comble et al.

(10) Patent No.: US 12,608,641 B2
(45) Date of Patent: Apr. 21, 2026

(54) INFORMATION PROCESSING APPARATUS AND INFORMATION PROCESSING METHOD

(71) Applicant: RAKUTEN, INC., Tokyo (JP)

(72) Inventors: Alois De La Comble, Tokyo (JP); Ken Prepin, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 384 days.

(21) Appl. No.: 17/289,356

(22) PCT Filed: Apr. 14, 2020

(86) PCT No.: PCT/JP2020/016453
§ 371 (c)(1),
(2) Date: Apr. 28, 2021

(87) PCT Pub. No.: WO2021/210073
PCT Pub. Date: Oct. 21, 2021

(65) Prior Publication Data
US 2023/0025450 A1 Jan. 26, 2023

(51) Int. Cl.
*G06N 20/00* (2019.01)

(52) U.S. Cl.
CPC .................................... *G06N 20/00* (2019.01)

(58) Field of Classification Search
CPC ..................................................... G06N 20/00
See application file for complete search history.

(56) References Cited

U.S. PATENT DOCUMENTS

| | | | | |
|---|---|---|---|---|
| 2013/0268469 A1* | 10/2013 | Sharma | .................. | G06F 30/367 |
| | | | | 706/46 |
| 2013/0329263 A1* | 12/2013 | Enomoto | ........... | H04N 1/00225 |
| | | | | 358/470 |
| 2014/0013215 A1* | 1/2014 | Sesum | ................. | G06V 30/414 |
| | | | | 715/247 |

(Continued)

FOREIGN PATENT DOCUMENTS

JP          2020-052689 A          4/2020

OTHER PUBLICATIONS

Li,m Yixin. Yajun Zou, and Jinwen Ma. "DeepLayout: A Semantic Segmentation Approach to Page Layout Analysis" 2018 [Online] Downloaded May 21, 25 https://link.springer.com/chapter/10.1007/978-3-319-95957-3_30 (Year: 2018).*

(Continued)

*Primary Examiner* — Ben M Rifkin
(74) *Attorney, Agent, or Firm* — Sughrue Mion, PLLC

(57) ABSTRACT

Disclosed herein is an information processing apparatus including: a training data acquisition unit configured to acquire training data; an input channel setting unit configured to set a plurality of input channels for inputting different features, respectively, from the training data acquired by the training data acquisition unit to a learning model to be trained with the training data; and a training unit configured to, in each training, randomly select, among the plurality of input channels set by the input channel setting unit, at least a part of the input channels, and deactivate an input from the selected input channel to the learning model to repeat training of the learning model.

14 Claims, 14 Drawing Sheets

(56) References Cited

U.S. PATENT DOCUMENTS

| | | | | |
|---|---|---|---|---|
| 2016/0171974 | A1* | 6/2016 | Hannun | G06N 3/084 |
| | | | | 704/232 |
| 2016/0292589 | A1* | 10/2016 | Taylor, Jr. | G06T 9/002 |
| 2017/0024642 | A1* | 1/2017 | Xiong | G06F 7/58 |
| 2019/0180154 | A1* | 6/2019 | Orlov | G06F 40/289 |
| 2020/0401889 | A1* | 12/2020 | Lee | G06N 3/08 |
| 2022/0083580 | A1* | 3/2022 | Yamamoto | G06F 18/2148 |

OTHER PUBLICATIONS

O'Gorman, Lawrence. "The Document Spectrum for Page Layout ANalysis" 1993 [Online] Downloaded May 21, 25 https://ieeexplore.ieee.org/stamp/stamp.jsp?tp=&arnumber=244677 (Year: 1993).*
Saihui Hou et al., "Weighted Channel Dropout for Regularization of Deep Convolutional Neural Network", University of Science and Technology of China, 8pages.
Nitish Srivastava et al., "Dropout: A Simple Way to Prevent Neural Networks from Overfitting", Journal of Machine Learning Research 15, 2014, pp. 1929-1958.
International Search Report for PCT/JP2020/016453 dated Jul. 28, 2020 [PCT/ISA/210].

* cited by examiner

FIG. 14

INFORMATION PROCESSING APPARATUS AND INFORMATION PROCESSING METHOD

CROSS REFERENCE TO RELATED APPLICATIONS

This application is a National Stage of International Application No. PCT/JP2020/016453 filed Apr. 14, 2020.

TECHNICAL FIELD

The present invention relates to an information processing apparatus, an information processing method and a program thereof, and more particularly, to a technique for providing a learned model by training a learning model for machine learning.

BACKGROUND ART

Machine learning using a learning model has been applied to various types of image analysis. For example, when an image to be analyzed is input to a learning model, the learning model can perform inference based on a machine learning algorithm to detect objects from the input image, classify the detected objects into categories, and output the objects labeled with the classified categories.

In order for such a learning model to perform inference with practical accuracy, it is required to train the learning model in advance with a sufficient number of training images with correct answers in the training phase, prior to the inference phase in which inference is performed on unknown images, according to the intended use of the inference.

In this learning phase, inference accuracy will be deteriorated if overfitting (in other words, overlearning) occurs. Overfitting refers to a state in which the learning model overfits the training data, but underfits the unknown data.

One of the regularization techniques to prevent overfitting, which deteriorates the accuracy of inference, is dropout.

Non-Patent Literature 1 (Saihui Hou, Zilei Wang, "Weighted Channel Dropout for Regularization of Deep Convolutional Neural Network", Association for the Advancement of Artificial Intelligence, 2019) discloses a technique for dropping out a certain percentage of layers of a learning model that consists of multiple layers. More particularly, the Non-Patent Literature 1 discloses a technique for randomly dropping out a certain percentage of convolutional layers out of a stack of multiple convolutional layers inside a Convolutional Neural Network (CNN) that constitutes a learning model to be trained. In the technique, a certain percentage of the convolutional layers in the CNN are randomly set to zero to drop out, and the remaining convolutional layers are rescaled to train the CNN.

LISTING OF REFERENCES

Non-Patent Literature

NON-PATENT LITERATURE 1: Saihui Hou, Zilei Wang, "Weighted Channel Dropout for Regularization of Deep Convolutional Nerural Network", Association for the Advancement of Artificial Intelligence, 2019

SUMMARY OF THE INVENTION

Problems to be Solved by the Invention

According to the technique in the Non-Patent Document 1, a certain percentage of convolutional layers inside the CNN are dropped out (i.e., deactivated) by randomly setting them to zero, which means that the CNN operates as a different learning model each time the CNN is trained. For this reason, it is expected to prevent overfitting (overlearning), similarly to the ensemble learning in which multiple learning models are fused together to produce a single learning model, while suppressing the computational cost.

However, conventional learning models lack robustness because the accuracy of inference is deteriorated when irregular input images that significantly differ from the images used for training are input.

The present invention has been made in order to solve the above mentioned problems and an object thereof is to provide an information processing apparatus, an information processing method, and a program capable of providing a learning model that is sufficiently robust even when irregular input data is input.

Solution to Problems

In order to solve the above mentioned problems, according to one aspect of the present invention, there is provided an information processing apparatus, comprising: a training data acquisition unit configured to acquire training data; an input channel setting unit configured to set a plurality of input channels for inputting different features, respectively, from the training data acquired by the training data acquisition unit to a learning model to be trained with the training data; and a training unit configured to, in each training, randomly select, among the plurality of input channels set by the input channel setting unit, at least a part of the input channels, and deactivate an input from the selected input channel to the learning model to repeat training of the learning model.

The information processing apparatus may further comprise: a pre-training unit configured to pre-train the learning model using a part of the input channels among the plurality of input channels, and the training unit adds at least a part of the input channels that were not used in pre-training among the plurality of input channels to the learning model pre-trained by the pre-training unit so as to train the learning model.

The pre-training unit may pre-train the learning model using a part of the input channels set in advance among the plurality of input channels.

The pre-training unit may calculate an initial value of a weight of an input channel to be added in training by the training unit from a weight of another input channel used in pre-learning, and the training unit may apply the initial value of the weight calculated by the pre-training unit to the input channel to be added in training by the training unit so as to train the learning model.

The plurality of input channels set by the input channel setting unit may include a first input channel group for inputting features associated with color from the training data to the learning model and a second input channel group for inputting features associated with text from the training data to the learning model.

The input channel setting unit may set the first input channel group to the learning model such that a text portion of the training data is masked.

The first input channel group may include a group of input channels for inputting RGB features from the training data to the learning model.

The second input channel group may include a group of input channels for inputting features of a font size and occurrence frequency of the font size from the training data to the learning model.

The learning model may be constituted with a multi-layered network, and the plurality of input channels may input the training data to nodes in a first layer of the learning model.

The training unit may rescale an input from an input channel other than the deactivated input channel among the plurality of input channels set by the input channel setting unit such that the input to the learning model is kept constant so as to train the learning model.

The information processing apparatus may further comprise: an inferencing unit configured to activate all of the plurality of input channels set by the input channel setting unit with respect to the learning model trained by the training unit, and input input data to the learning model to perform inference.

According to another aspect of the present invention, there is provided an information processing method executed by an information processing apparatus, comprising steps of: acquiring training data; setting a plurality of input channels for inputting different features, respectively, from the training data to a learning model to be trained with the training data; and in each training, randomly selecting, among the plurality of input channels, at least a part of the input channels, and deactivating an input from the selected input channel to the learning model to repeat training of the learning model.

According to yet another aspect of the present invention, there is provided an information processing program for causing a computer to execute information processing, the program causing the computer to execute processing comprising: a training data acquisition process for acquiring training data; an input channel setting process for setting a plurality of input channels for inputting different features, respectively, from the training data acquired by the training data acquisition process to a learning model to be trained with the training data; and a training process for, in each training, randomly selecting, among the plurality of input channels set by the input channel setting process, at least a part of the input channels, and deactivating an input from the selected input channel to the learning model to repeat training of the learning model.

Advantageous Effect of the Invention

According to the present invention, it makes it possible to provide a learning model that is sufficiently robust even when irregular input data is input.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 14 is a block diagram showing an exemplary hardware and network configuration of an image analysis system including the learning model controller apparatus according to the embodiment of the present invention.

DESCRIPTION OF EMBODIMENTS

Figure 1:
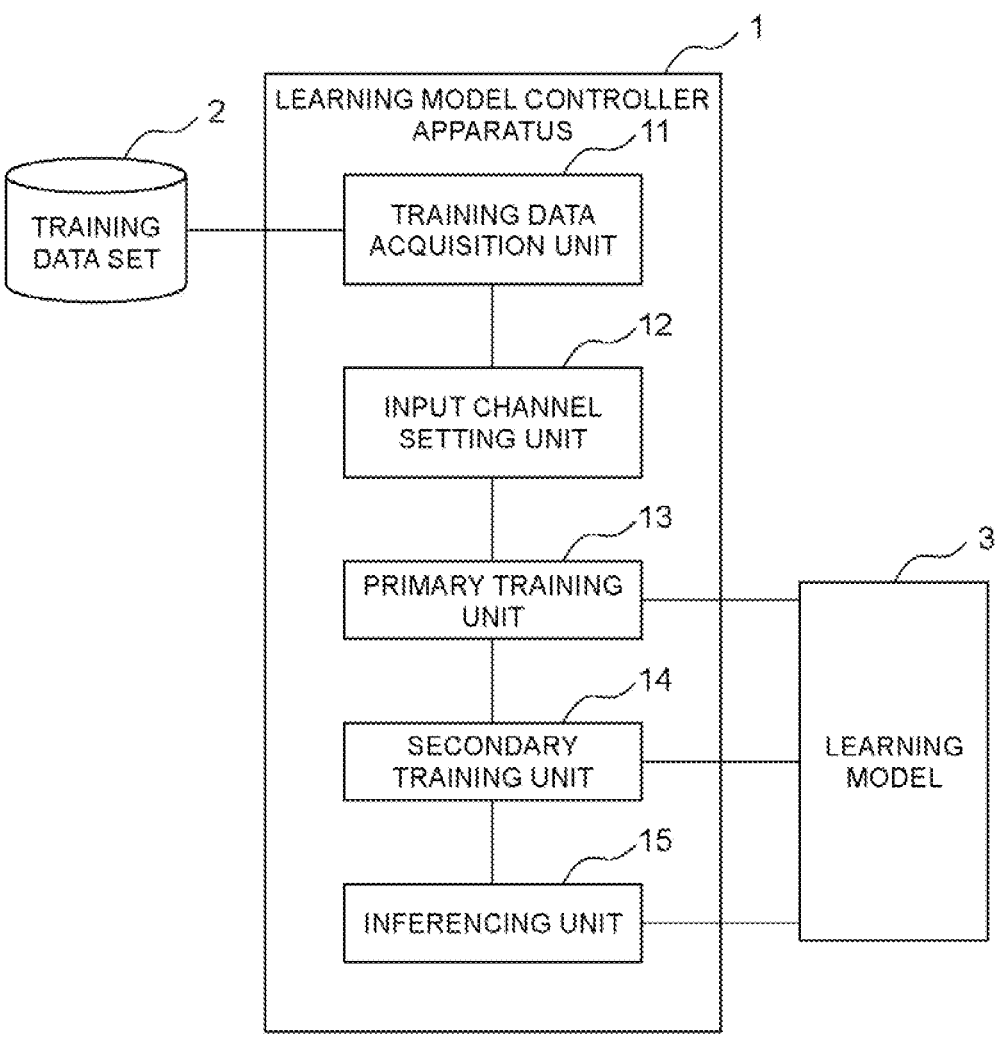
FIG. 1 is a block diagram showing an exemplary functional configuration of a learning model controller apparatus according to an embodiment of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a learning model controller apparatus according to the present embodiment trains a learning model that uses a machine learning algorithm to perform an image analysis processing to detect and classify objects from a document image that is a color image, but the present embodiment is not limited thereto.

The learning model controller apparatus according to the present embodiment can be applied to learning models for all kinds of applications. Those learning models may perform image analysis processing using, other than document images, color images, monochrome images, three-dimensional images including distance (depth) information, and the like as inputs, and may also perform natural language processing other than image analysis processing using, for example, audio data as inputs, and may be applied to all other machine learning applications.

<Functional Configuration of Learning Model Controller Apparatus>

FIG. 1 is a block diagram showing an exemplary functional configuration of a learning model controller apparatus according to the present embodiment.

The learning model controller apparatus 1 shown in FIG. 1 includes a training data acquisition unit 11, an input channel setting unit 12, a primary training unit 13, a secondary training unit 14, and an inferencing unit 15.

The learning data acquisition unit 11 acquires training data stored in the training data set 2 and subsequently supplies the training data to the input channel setting unit 12, the primary training unit 13, and the secondary training unit 14. The training data acquired by the training data acquisition unit 11 is data to be input to a learning model 3, which performs the machine learning, in order to train the learning model 3 in advance, and also data with a sufficient number of samples with correct answers. The training data may include, for example, images or audio or the like.

The training data set 2 may be stored in the built-in or external non-volatile storage device provided by the learning model controller apparatus 1, or alternatively may be transmitted from another communication device connected to the learning model controller apparatus 1 via a network.

The input channel setting unit 12 sets an input channel for inputting an image (document image), which is the training data supplied from the training data acquisition unit 11, to the learning model 3. The input channel is an input channel set to the learning model to cause the learning model 3 to extract features of the document image from the document image itself, which is the training data, and generate a feature map of each of the features.

When the training data is a color image, the color image is usually decomposed into three input channels. In other words, when a color image is input to the learning model 3, there are usually three input channels: an R input channel for inputting (extracting) R (Red) features to the learning model 3; a G input channel for inputting G (Green) features to the learning model 3, and a B input channel for inputting B (Blue) features to the learning model 3. The input channel setting unit 12 sets these three input channels of RGB to the learning model 3.

According to the present embodiment, the input channel setting unit 12 sets an additional feature channel as the input channel to input (extract) non-RGB features (features other than color) of the document image to the learning model 3 in addition to the three RGB input channels. The learning model controller apparatus 1 uses this additional feature channel as the input channel along with the RGB input channels to train the learning model 3. The setting of the additional feature channel will be described later with reference to FIGS. 6 to 8.

The primary training unit 13 performs the primary training on the learning model 3 by inputting the training data supplied by the training data acquisition unit 11 into the learning model 3. This primary training is a pre-training process that uses only the original RGB input channels.

According to the present embodiment, the primary training unit 13 can determine an initial value of a weight of a first layer of the learning model 3 for the additional feature channel set by the input channel setting unit 12, by pre-training the learning model 3 using the RGB input channels as the input channels. The initial value of the weight of the first layer of the learning model 3 for the additional feature channel may be, for example, an average value of the weights of the first layer for the RGB input channels.

The secondary training unit 14 performs the secondary training on the learning model 3 that has been primarily trained by the primary training unit 13. This secondary training is a process that further iteratively trains the primarily trained learning model 3 using the original RGB input channels and the additional feature channel set by the input channel setting unit 12. The secondary training unit 14 applies the initial value of the weight determined by the primary training unit 13 to the additional feature channel and causes the learning model 3 to be quadratically (secondarily) trained.

According to the present embodiment, the secondary training unit 14 randomly drops out (deactivates) at least one input channel out of all input channels to the learning model 3, including the RGB input channels and the additional feature channel, in each secondary training. The input from the dropped-out input channel to the learning model 3 will be all zero.

The inferencing unit 15 inputs an unknown document image to the trained learning model (i.e., learned model) 3, which has been trained by the primary training unit 13 and the secondary training unit 14, and causes the trained learning model 3 to perform the inference. More particularly, the trained learning model 3, for example, detects regions from the input document image, classifies the detected regions into categories, and outputs the information of the regions to which the classified categories are assigned as the inference result. In this inference phase, the learning model 3 uses all of the input channels set by the input channel setting unit 12 to perform the inference. The learning model 3 may be activated by another device or an image processing engine to perform the inference without the inference unit 15.

It should be noted that the configuration shown in FIG. 1 illustrates an exemplary functional configuration of the learning model controller apparatus and does not mean that the learning model controller apparatus is implemented in a single device. The functional configuration shown in FIG. 1 may be, for example, implemented in a plurality of servers or other devices interconnected by a network, and the components of the learning model controller apparatus 1, the training data set 2, and the learning model 3 shown in FIG. 1 may be implemented in the same device or in devices different from each other. For example, the primary training unit 13 and the secondary training unit 14 of the learning model controller apparatus 1 may be implemented in different devices from each other.

The following is a non-limiting example in which the learning model 3 to be trained by the learning model controller apparatus 1 is used to analyze a document image in Portable Document Format (PDF) file format that contains articles of newspapers, magazines, or the like, as contents, detect objects, classify the detected objects into categories, and label the objects with categories. In this case, the training data stored in the training data set 2 may be a document image for training that is PDF-generated per page. Nevertheless, the present embodiment is not limited thereto, and any image, audio, text, or other data may be used as the training data. Also, the storage format of the document image is not limited to PDF but can be any other image format such as Tagged Image File Format (TIFF), Joint Photographic Expert Group (JPEG), and the like, or any Desk Top Publishing (DTP) or document format such as (Adobe Illustrator (AI), Encapsulated PostScript (DPS), PhotoShop Document (PDS), and the like.

Figure 2:
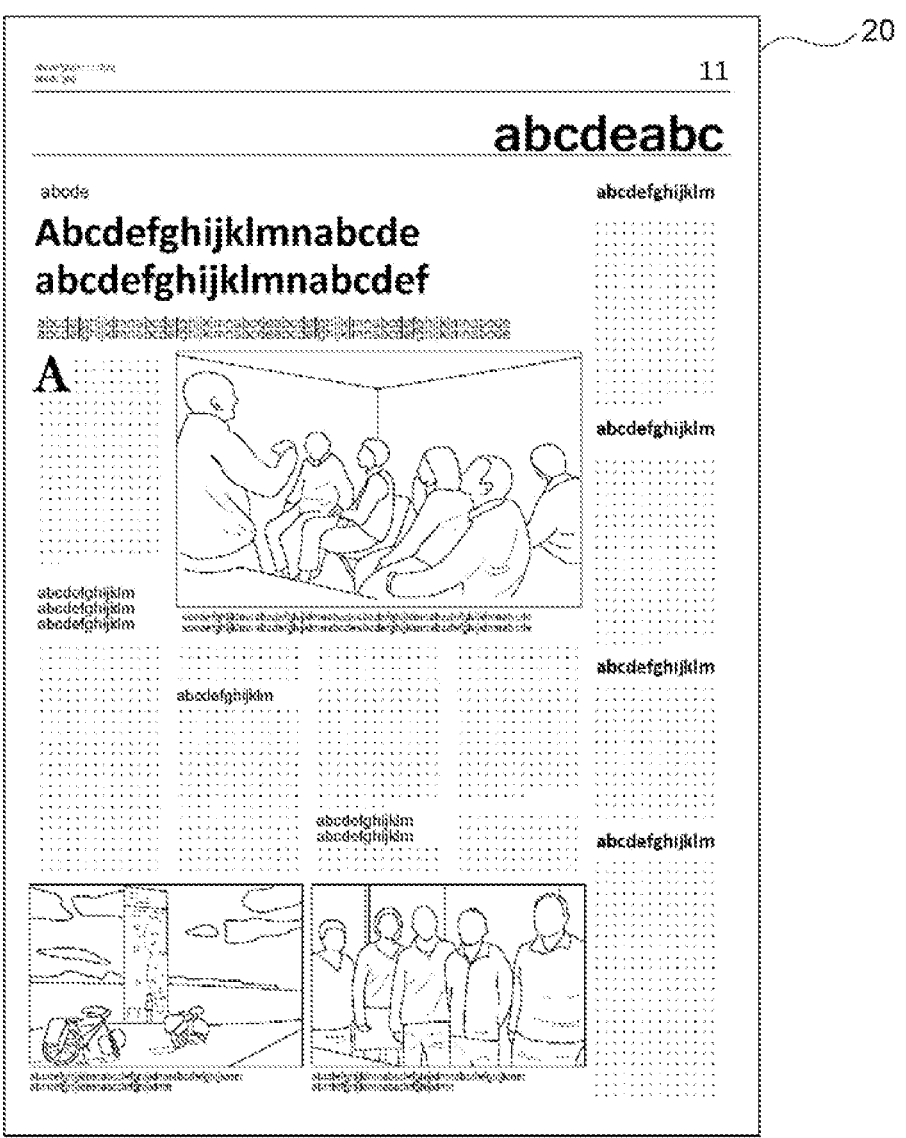
FIG. 2 is a schematic diagram illustrating an example of a document image input to a learning model via the learning model controller apparatus according to the embodiment of the present invention.

FIG. 2 is a schematic diagram illustrating an example of a document image input to a learning model 3 via the learning model controller apparatus 1 according to the present embodiment. The document image 20 shown in FIG. 2 is a one-page image containing text and images of a magazine article. The document image 20 is input to the learning model 3 via the input channels set by the input channel setting unit 12, and is used by the primary training unit 13 and the secondary training unit 14 to train the learning model 3. In the inference phase, a document image similar to the document image 20 is input to the learning model 3 via all input channels set by the input channel setting unit 12.

Figure 3:
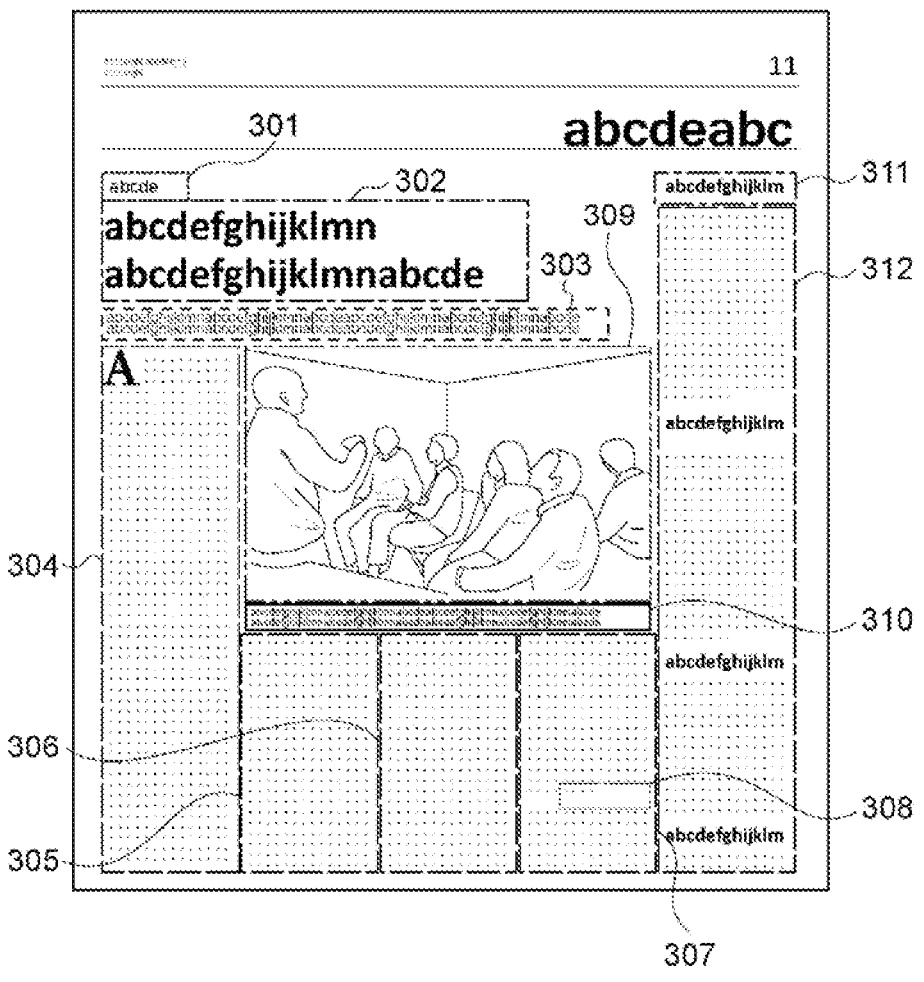
FIG. 3 is a schematic diagram illustrating an example of the document image in which regions are detected and categories are labeled thereto, which is output by the learning model trained by the learning model controller apparatus according to the embodiment of the present invention.

FIG. 3 is a schematic diagram illustrating an example of the document image in which regions are detected and categories are labeled thereto, which is output by the learning model 3 trained by the learning model controller apparatus 1 according to the present embodiment. Referring to FIG. 3, regions 301 to 312 are detected as objects from a one-page document image. The regions 301 to 312 are classified into categories, and the classified categories are labeled to the regions, respectively. More particularly, a region 301 is classified as pre-title, a region 302 and a region 311 as title, and a region 303 as subtitle. Regions 304 through 307 and 312 are classified as column (i.e., article body). A region 308 is detected at the end of the column region and is classified as the signature of the author of the article. A region 309 is classified as photo, and a region 310 is classified as caption describing the photo.

Assuming that the document image 20 shown in FIG. 2 is input to the learning model 3 in the training phase and the inference phase, respectively, the learning model 3 outputs a document image in which regions are detected and categories are labeled thereto as shown in FIG. 3.

<Processing Procedure of Training Processing of Learning Model>

Figure 4:
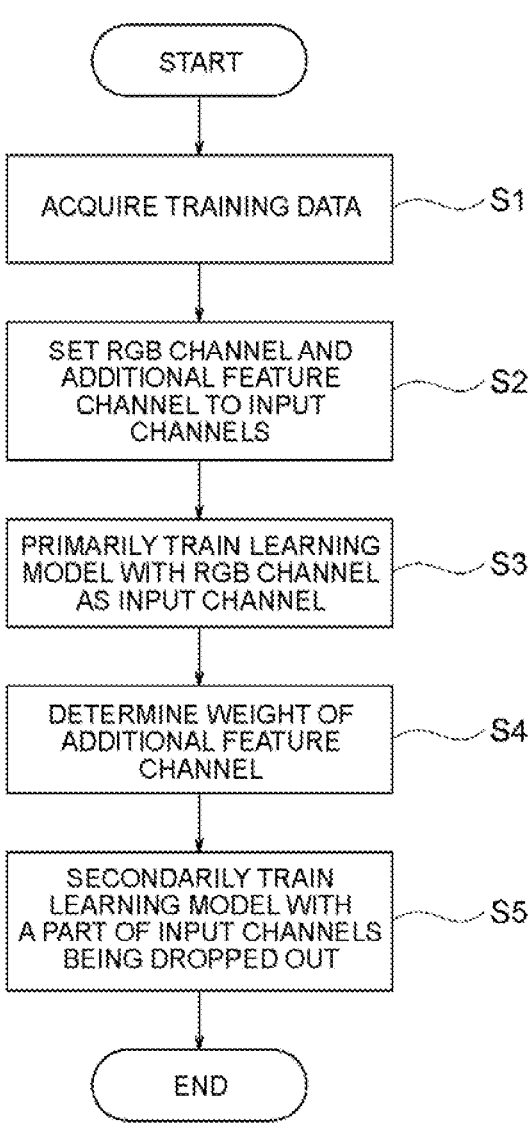
FIG. 4 is a flowchart showing an exemplary processing procedure of a training processing of the learning model performed by the learning model controller apparatus according to the embodiment of the present invention.

FIG. 4 is a flowchart showing an exemplary processing procedure of the processing of a training processing of the learning model 3, which is performed by the learning model controller apparatus 1 according to the present embodiment.

It should be noted that each step in FIG. 4 may be implemented by the CPU reading and executing the program stored in the memory of the learning model controller apparatus 1. Alternatively, at least a part of the flowchart shown in FIG. 4 may be implemented by hardware. In the case of hardware implementation, for example, a dedicated circuit can be automatically generated on a Field Programmable Gate Array (FPGA) from the program to execute each step by using a predetermined compiler. Alternatively, a gate array circuit can be formed in the same way as the FPGA and implemented as hardware. It can also be implemented by an Application Specific Integrated Circuit (ASIC).

In step S1, the training data acquisition unit 11 of the learning model controller apparatus 1 acquires a document image in, for example, a PDF file format, as the training data. This document image is training data with a correct answer for regions and categories, and may be read from the training data set 2, or may be input to the learning model controller apparatus 1 directly or from the outside via the network. Hereinafter, an example will be described in which the document image is an article from a newspaper, or magazine, or the like, which includes a title, a column (i.e., article body), and a photo or an illustration.

It should be noted that the document image acquired by the training data acquisition unit 11 may be an article containing text and images that have been originally created as a PDF file, or alternatively an article in paper media such as newspapers and magazines that have been scanned into a PDF file afterwards.

In step S2, the input channel setting unit 12 of the learning model controller apparatus 1 sets a plurality of input channels for inputting the document image, which is the training data acquired by the training data acquisition unit 11, to the learning model 3. More particularly, the input channel setting unit 12 separates the document image, which is the training data, into RGB input channels (three input channels), and further separates the document image into additional feature channels for inputting additional features of the document image into the learning model 3.

Figure 5:
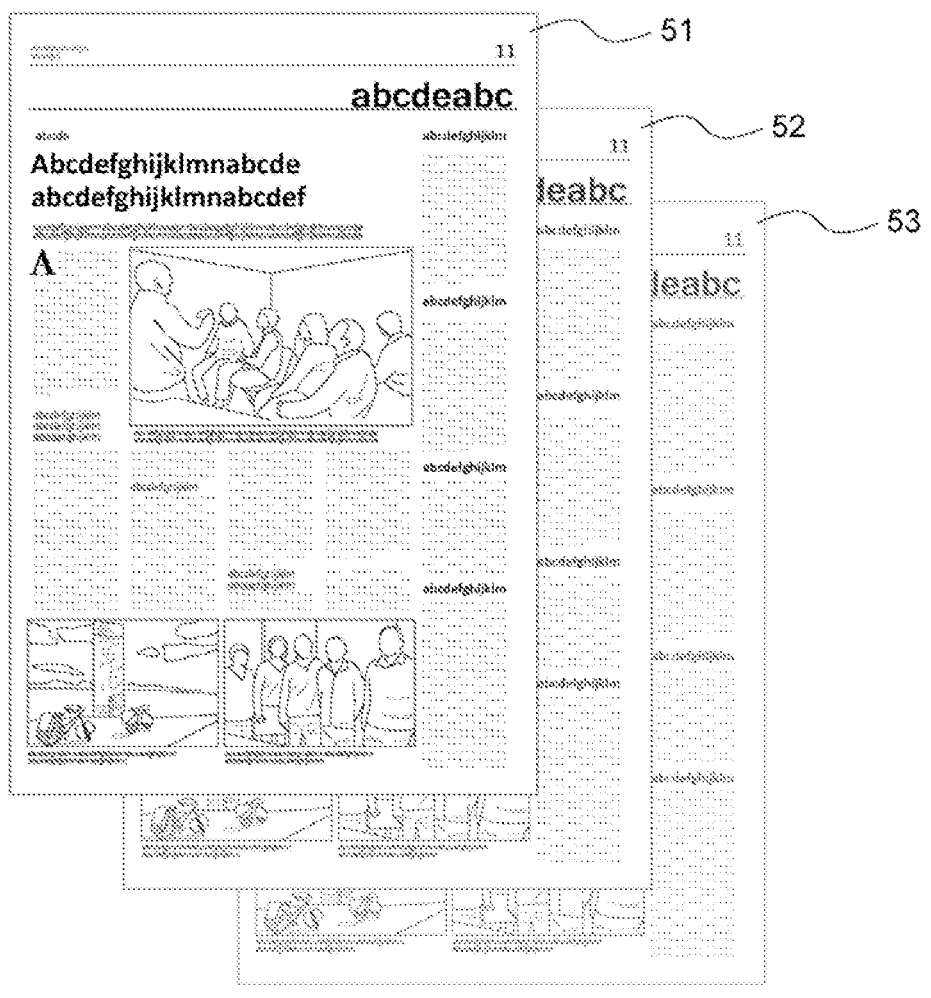
FIG. 5 is a schematic diagram illustrating an example of RGB input channels from the document image to the learning model.

FIG. 5 is a schematic diagram illustrating an example of RGB input channels from the document image 20 to the learning model 3. Referring to FIG. 5, three input channels separated from the document image 20 in FIG. 2 are shown: an R input channel 51, a G input channel 52, and a B input channel 53.

These RGB input channels are used to input respective RGB features of the document image, which is an RGB color image, to the learning model 3. The RGB input channels 51 to 53 may be set to input features of all regions in the document image, i.e., both text and image regions, to the learning model 3. Alternatively, non-image regions in the document image may be masked appropriately so that only the features of the image regions in the document image are input to the learning model 3. Since the text in the text part of a magazine is usually black, and there is no difference in feature amount among the RGB input channels for the regions including the text line (text area), it makes it possible to reduce the amount of computation in the learning model 3 by masking the regions other than the image regions and inputting them into the learning model 3.

It should be noted that the input channel of color to the learning model 3 set by the input channel setting unit 12 is not limited to any of RGB input channels. For example, infrared or far-infrared input channel may be set for the learning model 3 instead of or in addition to RGB input channels, each of which has a visible light wavelength band. By providing the infrared or far-infrared input channel for the learning model 3, for example, it makes it possible to detect objects with higher accuracy from images captured at night or under low illuminance, or from document images that include such images.

According to the present embodiment, the input channel setting unit 12 sets the additional feature channel associated with the features that the document image has. More particularly, the input channel setting unit 12 sets a plurality of additional feature channels for inputting features of the document image, especially those related to text lines (i.e., title, column (article body), and the like), to the learning model 3. The plurality of additional feature channels will be described with reference to FIGS. 6 to 8.

Figure 6:
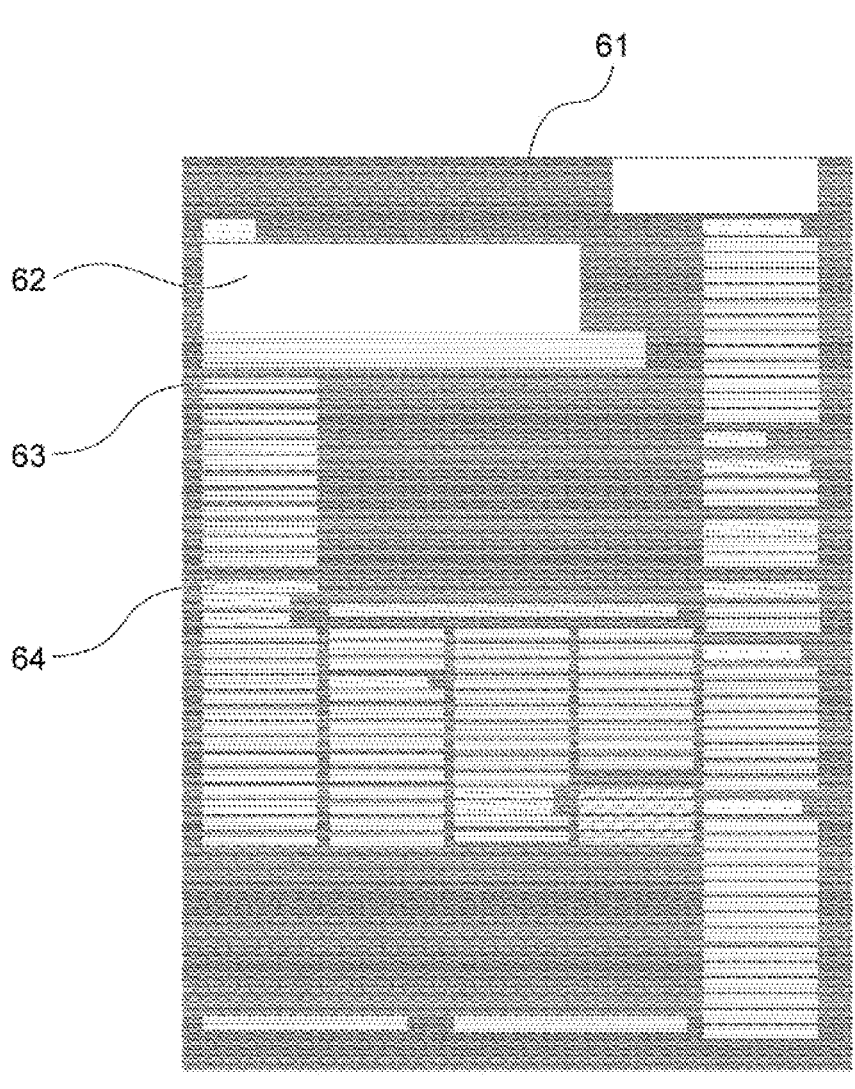
FIG. 6 is a schematic diagram illustrating an example of an additional feature channel for a font size set by the input channel setting unit of the learning model controller apparatus.

FIG. 6 is a schematic diagram illustrating an example of an additional feature channel for font size set by the input channel setting unit 12 of the learning model controller apparatus 1. The additional feature channel 61 for the font size shown in FIG. 6 inputs the font size features relative to the maximum font size to the learning model 3. Via the additional feature channel 61 for the font size shown in FIG. 6, the information of the font size of the text relative to the maximum font size of the text in the document image 20 shown in FIG. 2 is input to the learning model 3. The learning model 3 extracts the font size features from the document image 20 via the font size additional feature channel 61 to generate a feature map. The maximum font size may be the maximum font size of the text in a magazine or article, or a page that contains the document image.

Referring to FIG. 6, the larger the font size of a text line in the document image, the whiter the rectangular region corresponding to the text line is denoted. For example, the rectangular region 62 is whiter than either the rectangular region 63 or the rectangular region 64, which indicates that the rectangular region 62 is the text line with the largest font size in the document image. Since the largest font size is usually used for the title of an article, the rectangular region 62 can be estimated as the title in the article. Thus, the closer the font size is to the maximum font size of the magazine, the larger the feature amount will be extracted. Accordingly, the font size can be assumed to be a key feature for detecting the title in the article.

Similarly, the rectangular region 64 is denoted whiter than the rectangular region 63, which indicates that the rectangular region 64 is a text line with a larger font size than the text in the rectangular region 63. Thus, the rectangular region 64 can be estimated as the subtitle that uses the next larger font size after the title. On the other hand, regions of photos and illustrations for which no font size information is extracted are denoted in black, and the extracted feature amount is zero.

Although FIG. 6 shows an example in which the font size features of text lines are extracted from the document image of one page, information on the entire magazine or article to which the document image belongs may be added. For example, if one article spans multiple pages, then the title, subtitle, and columns (i.e., article bodies) may be reconstructed and reclassified across multiple pages by associating multiple document images that constitute one article and extracting font size features from associated multiple document images.

Figure 7:
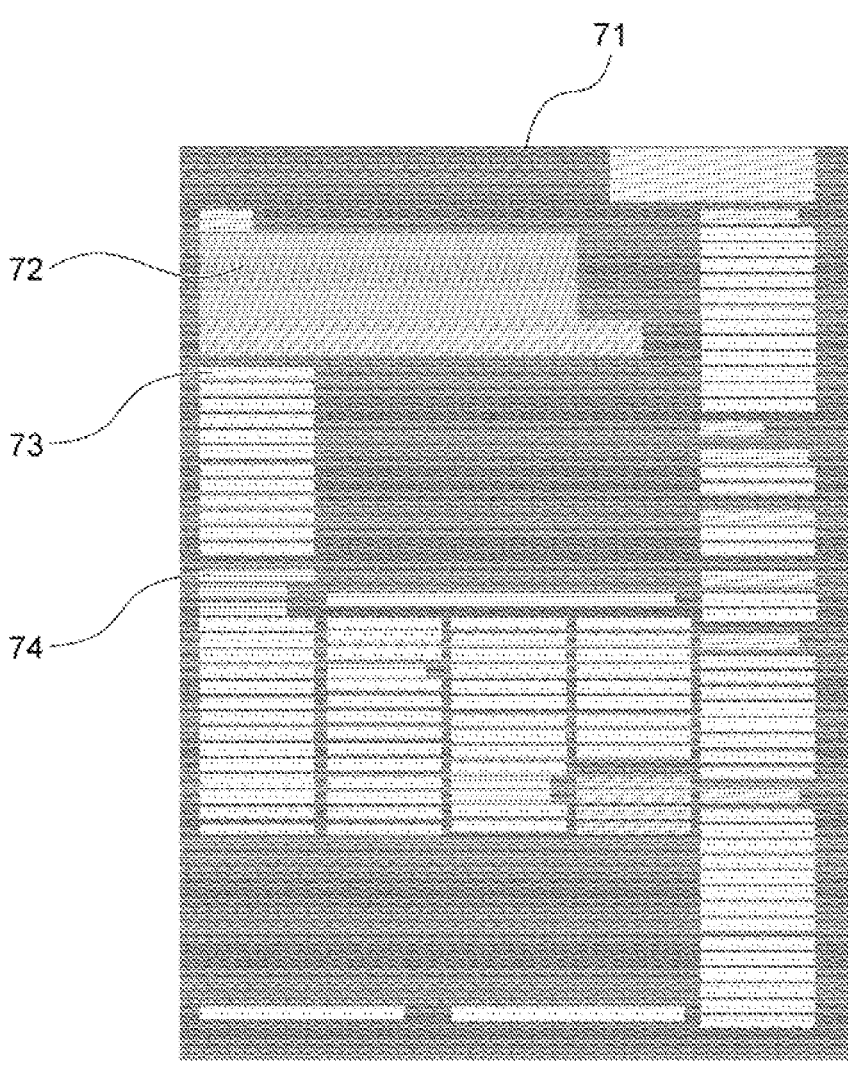
FIG. 7 is a schematic diagram illustrating an example of an additional feature channel for occurrence frequency of the font size set by the input channel setting unit of the learning model controller apparatus.

FIG. 7 is a schematic diagram illustrating an example of an additional feature channel for occurrence frequency of font size set by the input channel setting unit 12 of the learning model controller apparatus 1. The additional feature channel 71 for the occurrence frequency of font size shown in FIG. 7 inputs the features of the occurrence frequency of font size to the learning model 3. Via the additional feature channel 71 for the occurrence frequency of font size shown in FIG. 7, information on the occurrence frequency of font size (i.e., font size occurrence frequency) of text in the document image 20 shown in FIG. 2 is input to the learning model 3. The learning model 3 extracts the features of the occurrence frequency of font size from the document image 20 via the additional feature channel 71 for the occurrence frequency of font size to generate a feature map. The occurrence frequency of font size may be the occurrence frequency of the font size in the text in the magazine or article, or a page that contains the document image.

Referring to FIG. 7, the higher the occurrence frequency of font size in the text line in the document image, the whiter the rectangular region corresponding to the text line is denoted. For example, the rectangular region 73 is whiter than either the rectangular region 72 or the rectangular region 74, which indicates that the rectangular region 73 is the text line with the highest occurrence frequency of font size in the document image. Since the font size with the highest occurrence frequency is usually used for columns (article bodies), the rectangular region 73 can be estimated as the column (article body) in the article, and the rectangular region 72 and the rectangular region 74 can be estimated as the title, or the like, with a lower occurrence frequency of font size, respectively. Thus, the higher the occurrence frequency of font size, the larger feature amount will be extracted. Accordingly, the occurrence frequency of font size can be also assumed as a key feature for detecting titles or columns in an article. By extracting the occurrence frequency of font size as the feature, it makes it possible to distinguish among the main title of an article, less important additional titles, a magazine title on a front page of the magazine, and the like.

For example, the rectangular region 74 is denoted whiter than the rectangular region 72, which indicates that the rectangular region 74 is a text line with a higher occurrence frequency of font size than the text in the rectangular region 72. Thus, the rectangular region 74 can be estimated as the subtitle in which the next largest font size is used after the title. On the other hand, the regions of photos and illustrations for which no information on the occurrence frequency of font size is extracted are denoted in black, and the extracted feature amount is zero.

Although FIG. 7 shows an example in which the features of the occurrence frequency of font size (font size occurrence frequency) of text lines are extracted from the document image of one page, information on the entire magazine or article to which the document image belongs may be added. For example, if an article spans multiple pages, the regions of the titles, subtitles, and columns (article bodies) may be reconstructed and reclassified across multiple pages by associating multiple document images that constitute a single article and extracting the features of the occurrence frequency of font size from associated multiple document images.

If the character "A" at the beginning of the article is arranged larger than the following characters, as in the region 304 of the text line in FIG. 3, the font size may be corrected appropriately such that the font size of the opening character is the same as that of the following characters. Also, the character with a larger font size than the following characters may be identified as the opening character, and the position of the opening character may be used to detect the starting coordinates of the paragraph.

The text line regions 62, 63, 64, 72, 73, and 74 shown in FIGS. 6 and 7, respectively, are assumed to have information of coordinates that identifies the region in the document image and values from 0 to 255 corresponding to the feature amount of the text line regions.

Also, for example, the same text line regions have complementary feature amount values between FIGS. 6 and 7, as can be understood from the fact that the title line region 62 in FIG. 6 has the largest feature value, while the corresponding title line region 72 in FIG. 7 has the smallest feature value. Thus, it is preferable that the additional feature channels are set such that features that are specific to each other can be mapped by the learning model 3 to the corresponding feature maps.

It should be noted that the additional feature channels associated with the text lines that the input channel setting unit 12 sets for the learning model 3 are not limited to the font size and the occurrence frequency of font size. For example, in place of or in addition to the font size and the occurrence frequency of font size, the input channel setting unit 12 may set an additional feature channel for inputting features such as a font color and a font type to the learning model 3 as an input channel.

Figure 8:
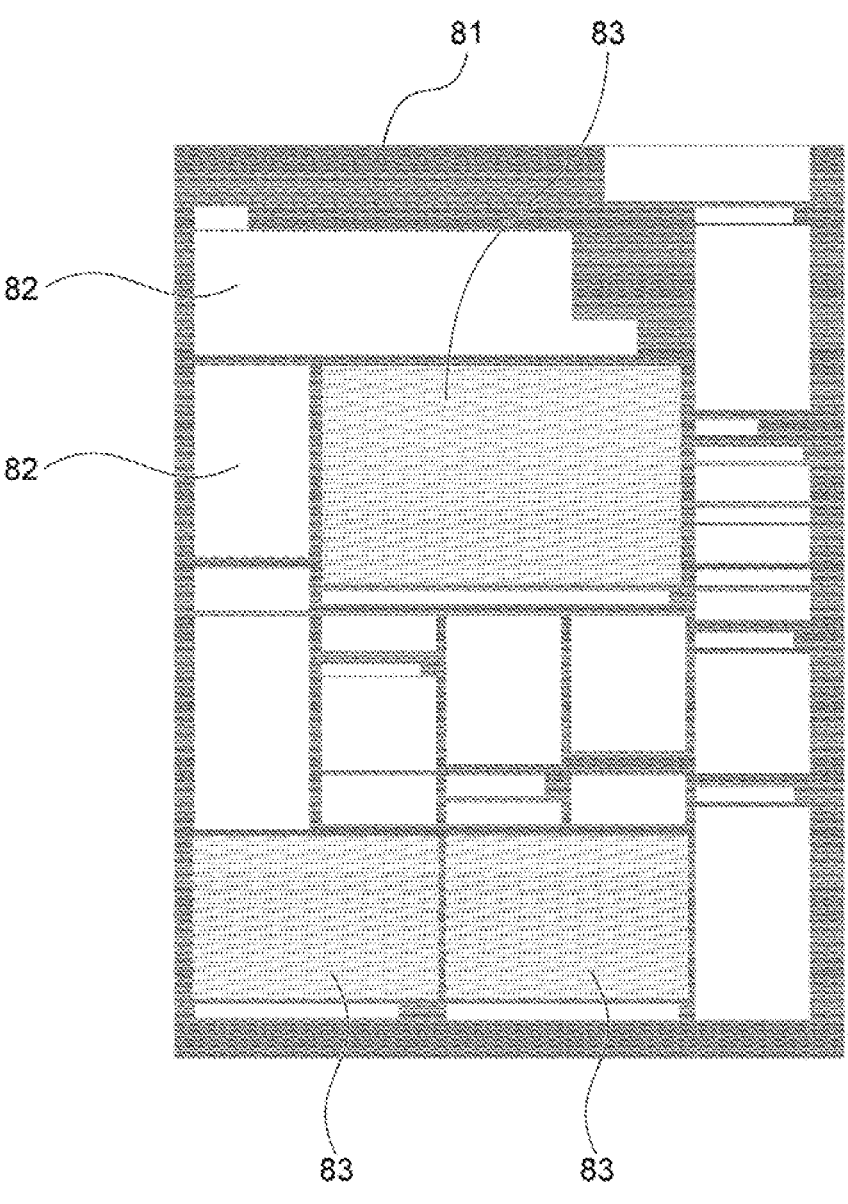
FIG. 8 is a schematic diagram illustrating an example of an additional feature channel for a paragraph/image indicator set by the input channel setting unit of the learning model controller apparatus.

FIG. 8 is a schematic diagram illustrating an example of an additional feature channel for a paragraph/image indicator set by the input channel setting unit 12 of the learning model controller apparatus 1. The additional feature channel 81 for the paragraph/image indicator shown in FIG. 8 inputs the features of the paragraph/image indicator that discriminates between the paragraph, which is a text region, and the image region in the document image to the learning model 3. Paragraphs, which are text regions, may include titles such as the pre-title, title, subtitle, and the like, and columns (article bodies). Via the paragraph/image indicator additional feature channel 81 shown in FIG. 8, information indicating either a paragraph, which is the text region, or an image of the 20 document images shown in FIG. 2 is input to the learning model 3. The learning model 3 extracts features that indicate either the paragraph or the image from the document image 20 through the paragraph/image indicator additional feature channel 81 to generate a feature map.

Referring to FIG. 8, paragraphs, which are the text regions in the document image, are denoted whiter than the image regions. For example, the rectangular region 82 is denoted whiter than the rectangular region 83, which indicates that the rectangular region 82 is a paragraph into which text lines are grouped. The paragraph/image indicator additional feature channel 81 in FIG. 8 includes the paragraph region 82, into which text lines are grouped, and the image region 83, which contains a photo or an illustration. By grouping the text lines, each of which has coordinate information, the learning model 3 can obtain the coordinate information of the entire paragraph and define the boundaries of the paragraph regions.

On the other hand, since the coordinate information of the image region can be acquired from the PDF file by parsing (i.e., syntactic analysis), the outline of the image region can be defined as shown as a gray region in FIG. 8. The learning model 3 can define the boundary of the image region based on the acquired coordinate information of the image region.

Even when the image and its coordinate information cannot be acquired from the PDF file by parsing, the learning model 3 may newly detect an image region by attempting to detect the image in a region of the input document image that is not identified as a paragraph.

On the other hand, blank regions that are not identified as either the paragraph or the image are denoted in black, and the extracted feature amount is zero.

Although FIG. 8 shows an example in which features of the paragraph or the image is extracted from a document image of one page, information on the entire magazine to which the document image belongs may also be added. For example, if an article spans multiple pages, then respective regions of paragraphs and images may be reconstructed and reclassified across multiple pages by associating multiple document images that constitute a single article and extracting the features of paragraphs or images from associated multiple document images.

Returning to FIG. 4, in step S3, the primary training unit 13 of the learning model controller apparatus 1 inputs the training data supplied by the learning data acquisition unit 11 to the learning model 3 to perform the primary training.

Figure 9:
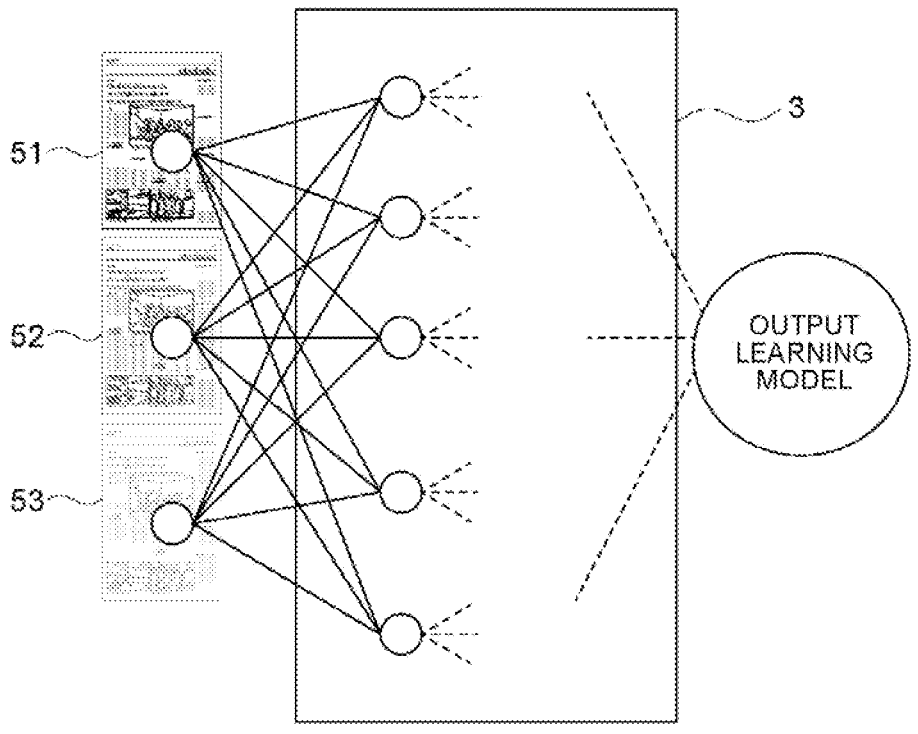
FIG. 9 is a schematic diagram illustrating an exemplary primary training processing of the learning model performed by the primary training unit of the learning model controller apparatus.

FIG. 9 is a schematic diagram showing illustrating an exemplary primary training (i.e., pre-training) processing of the learning model 3 performed by the primary training unit 13 of the learning model controller apparatus 1.

As shown in FIG. 9, in the primary training, the RGB color features of the document image are input to each of neurons (i.e., nodes) that constitutes the first layer of the network of the learning model 3 through the R input channel 51, the G input channel 52, and the B input channel 53, respectively.

The learning model 3 may use any machine learning algorithm capable of detecting objects from images and classifying the detected objects into categories. The machine learning algorithm of the learning model 3 may be, for example, Faster Region-Convolutional Neural Network (Faster R-CNN), but it is not limited thereto, and may use, for example, R-CNN, Fast R-CNN, You Only Look Once (YOLO), or the like may be used. FIG. 9 shows an exemplary configuration in which the learning model 3 includes a multi-layer network of CNNs such as Faster R-CNN.

The CNN has a configuration in which a plurality of convolutional layers are followed by a pooling layer, which is repeated several times, followed by a multilayer perceptron that is fully connected by a fully connected layer. The convolutional layer uses a filter to condense the feature points obtained from the input image to output a feature map. The pooling layer reduces the feature map output from the convolutional layer while retaining the information that is important as features. In the primary training, since three input channels 51, 52, and 53 of RGB are set to the learning model 3, the number of filters and the number of feature maps output from the filters are also tripled, respectively. As shown in FIG. 9, from the last layer (i.e., the fully connected layer) of the network of the learning model 3, a document image in which objects are detected and categories are labelled (assigned) as shown in FIG. 3 is obtained as the output of the learning model 3 with respect to the input document image 20. The primary training unit 13 performs the primary training (pre-training) of the learning model 3 by comparing the output document image with the correct answer data of the input document image, which is the training data.

In step S4, the primary training unit 13 of the learning model controller apparatus 1 determines the initial values of the weights of the first layer of the learning model 3 for the additional feature channels set by the input channel setting unit 12 in the primary training. More particularly, the primary training unit 13 may, for example, determine the average value of the weights of the first layer of the three input channels of RGB, which are known, as the initial value of the weights of the first layer of the learning model 3 for the additional feature channels. Alternatively, different initial values of the weights may be set for the RGB input channels and the additional feature channels depending on the color and brightness of the background or entire image of the document image, or the layout thereof, or the like. In addition, a fixed value may also be set in advance for the initial value of the weights for the additional feature channels. The initial values of the weights in the first layer are propagated to each layer after the second layer of the network of the learning model 3, and can be optimized in each layer.

In step S3, the primary training unit 13 causes the learning model 3 to primarily learn (i.e., to be pre-trained) with a data set of RGB-only document images having a sufficient number of samples. The primary training unit 13 may repeat the primary training of the learning model 3 up to a predetermined termination condition.

In step S5, the secondary training unit 14 of the learning model controller apparatus 1 performs the secondary training on the learning model 3 that has been primarily trained by the primary training unit 13. More particularly, the secondary training unit 14 further iteratively trains the primarily trained learning model 3 using the original RGB input channels as well as the additional feature channels set by the input channel setting unit 12. The secondary training unit 14 performs the secondary training of the learning model 3 by applying the initial weight values determined by the primary training unit 13 to the additional feature channels, namely, the font size additional feature channel 61, the font size occurrence frequency additional feature channel 71, and the paragraph/image indicator additional feature channel 81, respectively.

Figure 10:
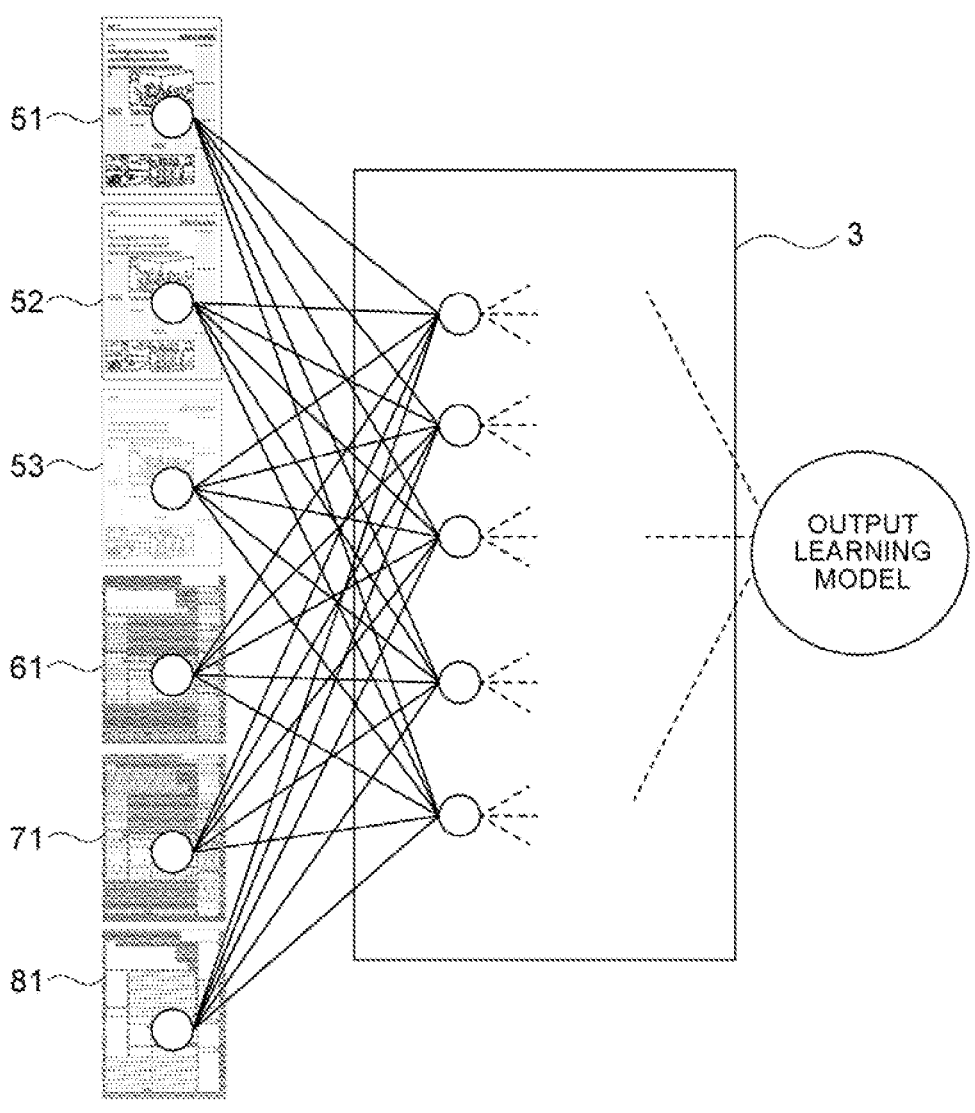
FIG. 10 is a schematic diagram illustrating an example of setting input channels to the learning model in the inference phase.

FIG. 10 is a schematic diagram illustrating an example of all input channels that can input document images, which are training data, to the learning model 3 in the secondary training processing of the learning model 3 performed by the secondary training unit 14 of the learning model controller apparatus 1.

As shown in FIG. 10, in the secondary training, in addition to the RGB input channels 51 to 53, for each of the neurons (i.e., nodes) that constitute the first layer of the network of the learning model 3, as additional feature channels, the font size additional feature channel 61, the font size occurrence frequency additional feature channel 71, and the paragraph/image indicator additional feature channel 81 can be set as input channels.

In order to train the learning model 3 on a given training data set, it is possible to use as few as one or two input channels. However, limiting the number of input channels in this way is likely to deteriorate the generalization performance for, for example, irregular images that differ considerably from the images in the training data set.

On the other hand, according to the present embodiment, the secondary training unit 14 enables the use of all input channels, including additional feature channels 61, 71, and 81, in addition to the RGB input channels 51 to 53, by setting all the input channels to the learning model 3 in order to train the learning model 3. By making all of the input channels available for extracting different features, respectively, it makes it possible to provide a robust learning model 3 even for irregular images that differ considerably from the images in the training data set.

The present embodiment further randomly drops out at least a part of all input channels in each secondary training. More particularly, the secondary training unit 14 deactivates an input from randomly selected input channel or channels out of all input channels by replacing them with all 0 (denoted in black) in each secondary training. The probability of the additional feature channel 61 being dropped out is 0.2, and the same is true for the additional feature channels 71 and 81. On the other hand, the RGB input channels 51 to 53 are either maintained as active input channels to the learning model 3 or are dropped out at the same time. The probability of the RGB input channels 51 to 53 being simultaneously dropped out is 0.2.

After a part of input channels are dropped out, the secondary training unit 14 rescales the remaining input channels to keep the magnitude of the input to the learning model 3 constant.

Figure 11:
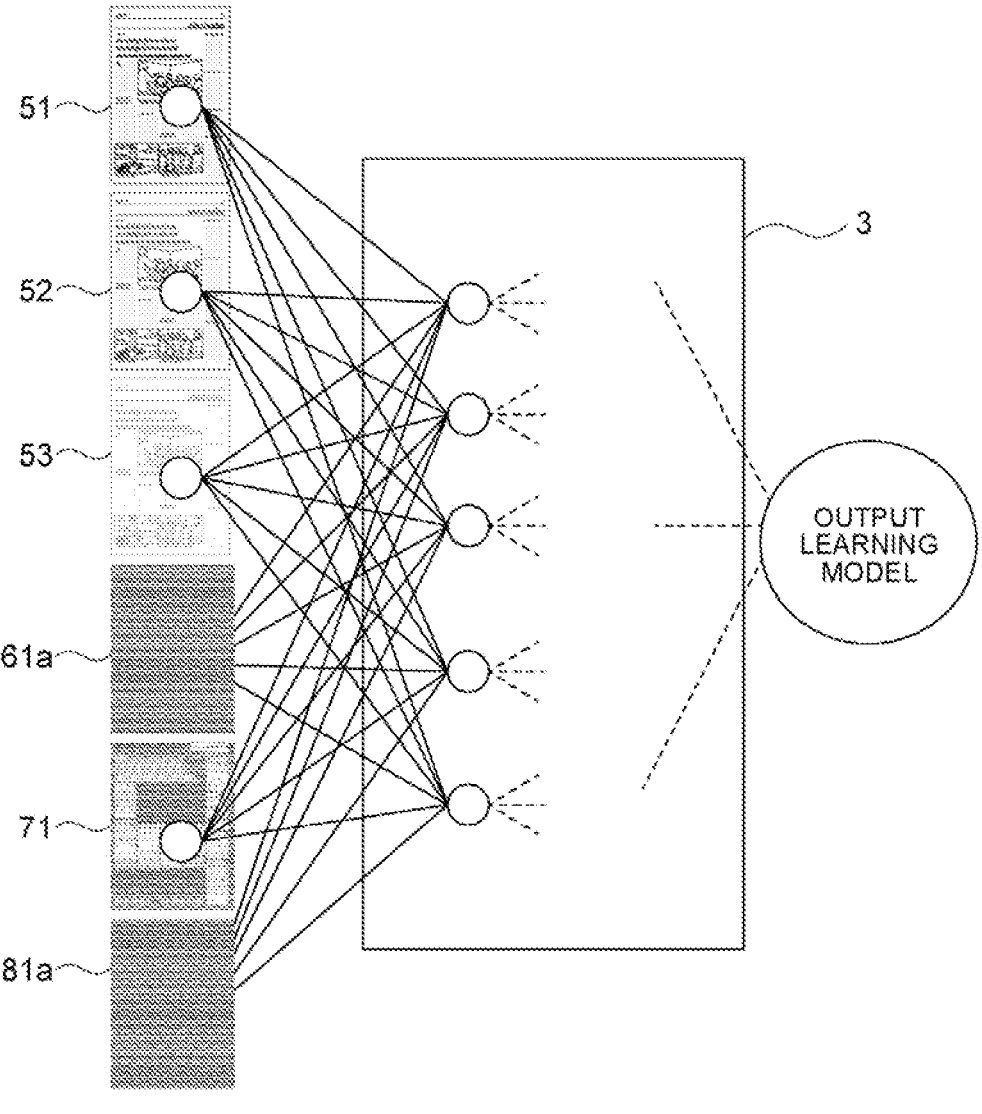
FIG. 11 is a schematic diagram illustrating an exemplary first secondary training processing of the learning model, which is performed by the secondary training unit of the learning model controller apparatus by dropping out a part of the input channels.

FIG. 11 is a schematic diagram illustrating an exemplary first secondary training processing of the learning model, which is performed by the secondary training unit 14 by dropping out a part of the input channels.

Referring to FIG. 11, among the six input channels, the font size additional feature channel 61 and the paragraph/image indicator additional feature channel 81 are randomly selected and dropped out, and replaced by zero input channels 61a and 81a, which input zero.

After the two input channels are dropped out, the secondary training unit 14 rescales the input channels by multiplying the remaining four input channels, i.e., RGB input channels 51 to 53 and the font size occurrence frequency additional feature channel 71, by 6/(6−2), which is 6/4, respectively.

Figure 12:
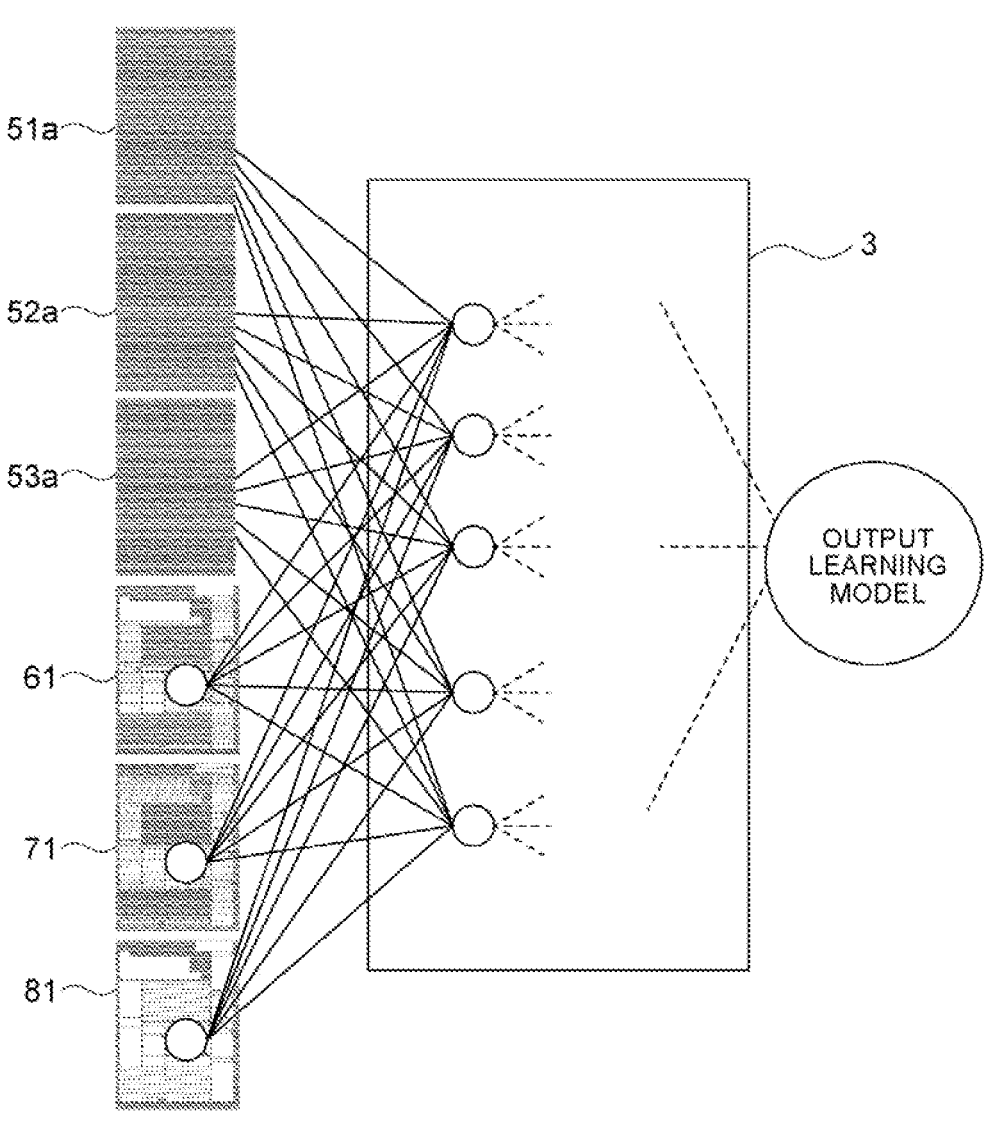
FIG. 12 is a schematic diagram illustrating an exemplary n-th secondary training processing of the learning model, which is performed by the secondary training unit of the learning model controller apparatus by dropping out another part of the input channels.

FIG. 12 is a schematic diagram illustrating an exemplary n-th secondary training processing of the learning model, which is performed by the secondary training unit 14 by dropping out another part of the input channels.

Referring to FIG. 12, among the six input channels, the RGB input channels 51 to 53 are randomly selected and simultaneously dropped out, and replaced by zero input channels 51a to 53a.

After the three input channels are dropped out, the secondary training unit 14 rescales the input channels by multiplying the remaining three input channels, i.e., the font size additional feature channel 61, the font size occurrence frequency additional feature channel 71, and the paragraph/image indicator additional feature channel 81, by 6/(6−3), which is 6/3, respectively. All the RGB input channels 51 to 53 are dropped out simultaneously with a dropout probability of 0.2.

As described above, by performing the above training processing from steps S1 to S5, the learning model controller apparatus 1 trains the learning model 3.

In the inference phase, in which an unknown document image is input to the learning model 3 to cause the learning model 3 to detect objects and perform image analysis to assign categories to the detected objects, as shown in FIG. 10, for each of neurons that constitute the first layer of the learning model 3, all input channels including the additional feature channels are activated. This allows the learning model 3 to perform image analysis on the unknown document image using all the input channels.

Figure 13:
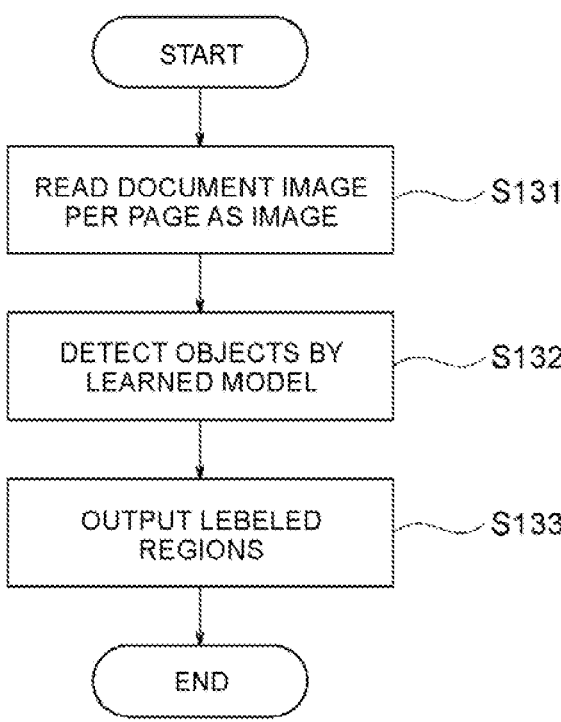
FIG. 13 is a flowchart showing an exemplary processing procedure of the processing of detecting regions from a document image performed by the learning model trained by the learning model controller apparatus.

FIG. 13 is a flowchart showing an exemplary processing procedure of the image analysis processing that the inferencing unit 15 of the learning model controller apparatus 1 causes the learning model 3 to perform.

In step S131, the inferencing unit 15 of the learning model controller apparatus 1 reads the unknown document image to be analyzed as a page-by-page image. Alternatively, the inferencing unit 15 may read a document image that has been read page by page in advance and stored in a non-volatile storage device in PDF file format.

In step S132, the inferencing unit 15 of the learning model controller apparatus 1 inputs the document image read out in step S131 to the learning model 3 that has already been trained to cause the learning model 3 to detect objects and label categories to the detected objects. The learning model 3 used in step S132 may be, for example, the Faster R-CNN. More particularly, the inferencing unit 15 inputs document images to the learning model 3 using all the input channels set by the input channel setting unit 12. Referring to FIG. 10, the document image input in step S131 is input through six input channels, namely, the RGB input channels 51 to 53, the font size additional feature channel 61, the font size occurrence frequency additional feature channel 71, and the paragraph/image indicator additional feature channel 81, to each of neurons in the first layer (convolutional layer) of the learning model 3.

The trained learning model 3 extracts the feature map of the document image from the entire input one-page document image. When the learning model 3 is constituted with the R-CNN, Faster R-CNN or Fast R-CNN, the learning model 3 then uses the Region Proposal Network (RPN) to output the bounding box of the candidate region and the confidence score indicating the likelihood that the candidate region includes an object to be detected with respect to the feature map of the document image, which is extracted by the CNN. More particularly, the RPN is a small neural network that operates on the feature map with sliding windows of size n×n. The RPN uses n×n region of interest as an input to the network to estimates k candidate regions for each of sliding window positions. When a plurality of bounding boxes are duplicately detected with respect to the same object, for example, Non-Maximum Suppression may be used to suppress the regions other than the bounding box with the maximum confidence score.

The Faster R-CNN classifies the bounding boxes of the estimated candidate regions into any of a plurality of categories such as the title, the column, the image, and the like, based on the feature vectors extracted from the candidate regions.

In step S133, the inferencing unit 15 of the learning model controller apparatus 1 acquires from the learning model 3 the document images divided into regions with labeled categories. More particularly, the learning model 3 extracts the regions of objects labeled with categories from the document image by convolving and pooling the feature maps extracted in the first convolutional layer with each of the second and subsequent layers, and finally fully connecting them all.

<Hardware Configuration of the Present Embodiment>

Figure 14:
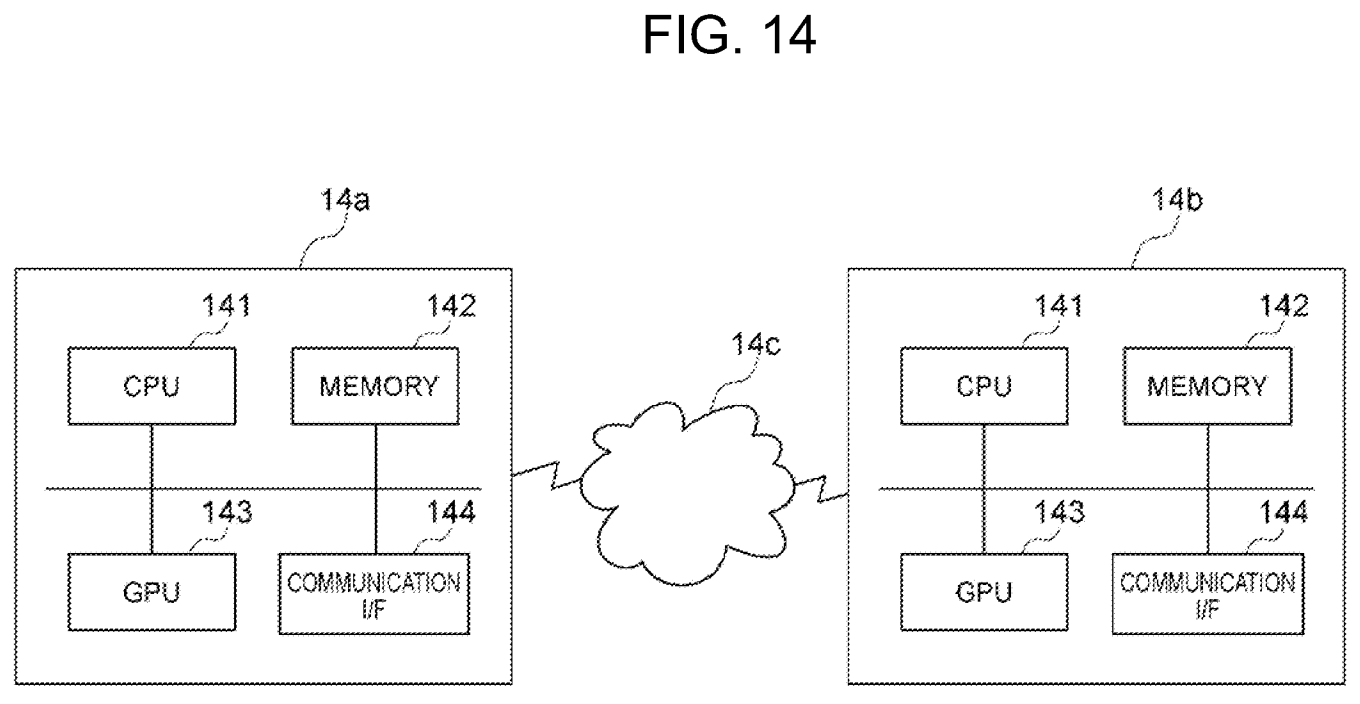

FIG. 14 shows an exemplary hardware configuration of the image analysis system including the learning model controller apparatus 1, the training data set 2, and the learning model 3 according to the present embodiment.

The image analysis system according to the present embodiment can be implemented on any one or more computers, mobile devices, or any other processing platform.

Referring to FIG. 14, there is shown an example in which the image analysis system according to the present embodiment is implemented in a computer system including a plurality of computers 14a and 14b.

A plurality of computers 14a and 14b are interconnected by a wired or wireless network 14c so as to be able to communicate with each other.

The computers 14a and 14b each include a Central Processing Unit (CPU) 141, a memory 142, a Graphics Processing Unit (GPU) 143, and a communication I/F 144. The CPU 141, the memory 142, the GPU 143, and the communication IN 144 are interconnected by a bus.

Although two computers 14a and 14b are illustrated in FIG. 14, the number of computers on which the present embodiment can be implemented is not limited thereto and may be a single computer or three or more computers. All or part of the computers 14a and 14b may include an output device such as a display for outputting the various processing results described above, and an input device for inputting various commands.

The CPU 141 is constituted with one or more processors, which reads a program from a Read Only Memory (ROM) to a Random Access Memory (RAM) and uses the RAM as a work area to execute the loaded program. Thus, the CPU 141 comprehensively controls respective components of the computers 14a and 14b. The program read by the CPU 141 may be provided, for example, via the network 14c, such as the Internet, or may be stored in a computer readable external storage medium, such as a DVD-ROM or USB memory, and then supplied to the CPU 141.

The memory 142 includes a memory device such as the ROM, the RAM, and a hard disk drive. The ROM is a non-volatile read-only memory that stores control instructions or programs that operate the CPU 141. The RAM is a volatile random access memory used for a work memory or a temporary storage of data when executing programs.

The GPU 143 has higher computing capabilities than the CPU 141, and by operating multiple or a large number of GPUs 143 in parallel, it makes it possible to provide higher processing performance, particularly for the image processing applications that use the machine learning such as the present embodiment. The GPU 143 typically includes a processor and a shared memory. Respective processors acquire data from a high speed shared memory and execute a common program so as to execute the same kind of computation in a large amount at high speed.

The communication I/F 144 is an interface that allows the computers 14a and 14b to communicate with other computers, such as servers, and may include, for example, a network interface card (NIC). The communication I/F 144, under the control of the CPU 141, inputs information received from other computers into the CPU 141 or the memory 142 and transmits information to other computers.

As described above, according to the present embodiment, the learning model controller apparatus sets a plurality of input channels to the learning model and repeats the processing of randomly dropping out a part of the input channels among the set input channels to be used in the inferencing phase to train the learning model.

As a result, according to the learning model controller apparatus of the present embodiment, since different features can be input to the learning model from a given training data set via a larger number of input channels, it makes it possible to provide a robust learning model in which the accuracy is not lowered even when analyzing irregular input data that is different from the training data.

Furthermore, according to the present embodiment, when repeatedly training the learning model with a given training data set, at least a part of the input channels is randomly dropped out to train the learning model, so that the learning model is trained with different inputs from the given training data set each time. Therefore, even with a small number of samples, it makes it possible to effectively prevent the learning model from overlearning (overfitting) and improve the generalization performance.

Accordingly, it makes it possible to provide a learning model that is robust even when irregular data is input, while effectively preventing overlearning.

Although specific embodiments have been described above, the embodiments described are illustrative only and are not intended to limit the scope of the present invention. The apparatus and method described herein may be embodied in other forms than as described above. In addition, it is also possible to appropriately omit, substitute, or modify the above described embodiments without departing from the scope of the present invention. Embodiments with such omissions, substitutions and modifications fall within the scope of the appended claims and equivalents thereof and also fall within the technical scope of the present invention.

REFERENCE SIGNS LIST

1: Learning Model Controller Apparatus; 2: Training Data Set; 3: Learning Model; 11: Training Data Acquisition Unit; 12: Input Channel Setting Unit; 13: Primary Training Unit; 14: Secondary Training Unit; 15: Inferencing Unit

What is claimed is:

1. An information processing apparatus, comprising:

at least one memory configured to store program code;

at least one processor configured to operate as instructed by the program code, the program code including:

acquisition code configured to cause at least one of the at least one processor to acquire training data;

setting code configured to cause at least one of the at least one processor to set a plurality of input channels for inputting different features from the training data acquired—to a learning model to be trained with the training data and organize the plurality of input channels into a first input channel group for inputting features associated with color from the training data and a second input channel group for inputting features associated with text from the training data; training code configured to cause at least one of the at least one processor to, in each training, randomly select, among the plurality of input channels set, at least a part of the input channels, deactivate an input channel from the selected input channel to the learning model to repeat training of the learning model, and rescale remaining input channels by a factor equal to a total number of the plurality of input channels divided by a number of remaining active input channels to maintain constant input magnitude to the learning model; and inferencing code configured to cause at least one of the at least one processor to activate all of the plurality of input channels set with respect to the learning model trained, and input input data to the learning model to perform inference.

2. The information processing apparatus according to claim 1, wherein the program code further includes:

pre-training code configured to cause at least one of the at least one processor to pre-train the learning model using a part of the input channels among the plurality of input channels, and wherein the training code is further configured to cause at least one of the at least one processor to add at least a part of the input channels that were not used in pre-training among the plurality of input channels to the learning model pre-trained so as to train the learning model.

3. The information processing apparatus according to claim 2, wherein the pre-training code is further configured to cause at least one of the at least one processor to pre-train the learning model using a part of the input channels set in advance among the plurality of input channels.

4. The information processing apparatus according to claim 2, wherein the pre-training code is further configured to cause at least one of the at least one processor to calculate an initial value of a weight of an input channel to be added in training from a weight of another input channel used in pre-learning, and the training code is further configured to cause at least one of the at least one processor to apply the initial value of the weight calculated to the input channel to be added in training so as to train the learning model.

5. The information processing apparatus according to claim 1, wherein the plurality of input channels set includes a first input channel group for inputting features associated with color from the training data to the learning model and a second input channel group for inputting features associated with text from the training data to the learning model.

6. The information processing apparatus according to claim 5, wherein setting code is further configured to cause at least one of the at least one processor to set the first input channel group to the learning model such that a text portion of the training data is masked.

7. The information processing apparatus according to claim 5, wherein the first input channel group includes a group of input channels for inputting RGB features from the training data to the learning model.

8. The information processing apparatus according to claim 5, wherein the second input channel group includes a group of input channels for inputting features of a font size and occurrence frequency of the font size from the training data to the learning model.

9. The information processing apparatus according to claim 1, wherein the learning model is constituted with a multi-layered network, and the plurality of input channels input the training data to nodes in a first layer of the learning model.

10. The information processing apparatus according to claim 1, wherein the training code is further configured to cause at least one of the at least one processor to rescale an input from an input channel other than the deactivated input channel among the plurality of input channels set such that the input to the learning model is kept constant so as to train the learning model.

11. The information processing apparatus according to claim 1, wherein the training code is further configured to cause at least one of the at least one processor to coordinate dropout behavior such that RGB input channels within the first input channel group are dropped out simultaneously as a group when selected for deactivation.

12. The information processing apparatus according to claim 1, wherein the second input channel group includes input channels for inputting font size features relative to maximum font size and occurrence frequency features of the font size from the training data to the learning model.

13. An information processing method, performed by at least one processor and comprising:

acquiring training data;

setting a plurality of input channels for inputting different features, respectively, from the training data to a learning model to be trained with the training data;

organizing the plurality of input channels into a first input channel group for inputting features associated with color from the training data and a second input channel group for inputting features associated with text from the training data;

in each training, randomly selecting, among the plurality of input channels, at least a part of the input channels, and deactivating an input from the selected input channel to the learning model to repeat training of the learning model;

rescaling remaining input channels by a factor equal to a total number of the plurality of input channels divided by a number of remaining active input channels to maintain constant input magnitude to the learning model; and activate all of the plurality of input channels with respect to the learning model, and input input data to the learning model to perform inference.

14. A non-transitory computer readable medium storing a computer program that when executed by at least one processor, causes the at least one processor to:

acquire training data;

set a plurality of input channels for inputting different features, respectively, from the training data to a learning model to be trained with the training data;

organize the plurality of input channels into a first input channel group for inputting features associated with color from the training data and a second input channel group for inputting features associated with text from the training data;

in each training, randomly select, among the plurality of input channels, at least a part of the input channels, and deactivate an input from the selected input channel to the learning model to repeat training of the learning model;

rescale remaining input channels by a factor equal to a total number of the plurality of input channels divided by a number of remaining active input channels to maintain constant input magnitude to the learning model; and activate all of the plurality of input channels with respect to the learning model, and input input data to the learning model to perform inference.

\* \* \* \* \*